United States Patent Office 3,370,917
Patented Feb. 27, 1968

3,370,917
PRODUCTION OF ZEOLITIC ADSORBENTS IN NODULAR FORM
Emil Eichhorn, Timonium, and Larry G. Garrison, Baltimore, Md., assignors to W. R. Grace & Co., New York, N.Y., a corporation of Connecticut
No Drawing. Filed May 20, 1965, Ser. No. 457,496
8 Claims. (Cl. 23—112)

This invention relates to a process for the production of zeolitic adsorbents in nodular form. In one specific embodiment, it relates to a process for preparing zeolitic adsorbents commonly known as molecular sieves in the form of nodules without the use of clay or other extraneous materials as binders.

Molecular sieves are microselective adsorbents in the zeolite group. They are crystalline metal aluminosilicates with three-dimensional network of silica and alumina tetrahedra. The zeolite structure is characterized by a repeating three-dimensional network of large aluminosilicate cages connected by smaller uniform openings or pores. After synthesis, these large cavities are filled with water which can be driven off by heat without collapsing the cage. When dehydrated, these cavities can readsorb large quantities of water or other vapors at low partial pressure. Due to the small uniform strictures or pore openings connecting the aluminosilicate cages, these zeolites exhibit the unique property of excluding larger molecules from the cavity while allowing smaller molecules to pass through and be adsorbed thereby acting as microselective adsorbents for the molecules according to their size and shape.

It has been shown that adsorbents having an effective pore size of about 4 A. are of particular interest in adsorbing vapors of low molecular weight materials such as water, ethene, ethylene, propylene and mixtures of the same with larger molecules and branch chained hydrocarbons.

The molecular sieves, as prepared synthetically, are recovered as a product in the micron size range. These materials, as they are prepared, are not particularly attractive for use in adsorption processes. The small size of the materials causes problems with channeling, etc., when they are placed in a tower to be used in an adsorption process. To overcome this difficulty, several of the workers in the prior art have devised various means of forming the molecular sieves into larger size units.

One of the methods of the prior art involves binding the micron sized molecular sieve particles together into nodules using clay as a binder. Although this method works satisfactorily, there are several problems inherent in its use. The most important, of course, is the fact that the addition of a material, such as clay, which is an inert material, reduces the adsorption of the final product, since the binder is incapable of adsorption.

It is thus important to prepare these materials in a form that lends itself readily to use of adsorption systems without resorting to the use of binding agents.

Prior art processes have been developed which prepare binderless molecular sieves as extrudates. The preparation of binderless molecular sieves in nodular form, however, presents problems not encountered in the preparation of extrudates. The reaction of an alkali metal hydroxide solution with clay or alumina is highly exothermic. The heat developed in this reaction can be easily controlled when extrudates are being formed by controlling the extrusion rate, cooling the extrudates, etc.

In preparing binderless molecular sieves in nodular form, however, a method must be devised that will provide an alkali metal hydroxide solution of sufficient concentration to complete zeolite formation, while at the same time, controlling the temperature rise to avoid excessive temperatures in the reactor.

We have found that nodules of zeolitic molecular sieves can be prepared in a system wherein the concentration of alkali metal hydroxide solution in the reactor is maintained constant throughout the reaction.

Our binderless molecular sieve process is a process that was developed and is particularly adaptable for plant production of this product. Broadly speaking, the process comprises the steps of preparing green nodules, aging the nodules, digesting the nodules for a proper period of time, crystallizing the nodules to form the desired product, followed by washing, drying and calcination steps.

The clay component from which the preformed bodies are made can be any kaolin-type clay or a mixture of kaolin-type clays. Representative of suitable kaolin-type clay minerals include kaolinite, levisite, nacrite, dickite, endellite, halloysite, and the like. In order to convert these kaolin-clays to a reactive form suitable in the process of this invention, it is necessary that the clay be calcined at a temperature within the range of from 550 to 850° C. and preferably at a temperature within the range of from about 600 to 700° C. This calcination converts the clay to an alkaline hydroxide reactive form.

The other components from which the preformed bodies are made comprise an alkali metal hydroxide such as sodium hydroxide and water.

Our novel process comprises preparing the molecular sieve from the raw materials in the proper form.

In forming these bodies from the clay, water and alkali metal hydroxide, a wide-variety of methods can be employed. The particular method employed is chosen by the shape which is desired, as for example, beads, spheres, pellets, granules, cylinders, tubes, partitions, toroids, cubes, sieves and the like. These bodies may have a relatively small size as well as more massive structure, depending upon the desired end use. Typical methods which can be employed include molding, tumbling, drum-rolling, casting, slip-casting, disk-forming, belt-forming, prilling, tableting, and briquetting. Well known conventional processing equipment such as pony mixers, Nauta mixers and the like can be employed.

The first step of one suitable process is the preparation of the green nodules. The raw materials are formed into large, rough nodules by adding NaOH solution to clay in a small mixer. The NaOH is added as solution containing 15% by weight NaOH. These large, rough nodules are granulated to form a material having a size in the desired range. The preparation of the rough nodules and the granulation of these nodules are necessary since it is impossible to prepare nodules having a proper size specification without use of this step.

In the next step of the process, additional clay and 15% NaOH solution are mixed in proportions such that the mixture contains 0.06 to 0.10, preferably about 0.08 mole $Na_2O$ per mole of $SiO_2$. This mixture is a slightly damp powder and is used to control the size of the nodules prepared from the granulation of the larger materials as prepared in the previous step. In this step, sufficient 15% NaOH is added to the granulated product and nodules are formed in a commercially available mixer. Particularly good results are achieved when this step is carried out in a Nauta mixer. The nodule formation is continued until the nodules of the proper size have been formed. At that point, a large quantity of the clay-NaOH mix that contains about 0.080 mole of $Na_2O$ per mole of $SiO_2$ is added. The amount of NaOH added to the clay is regulated so that the product contains $Na_2O$ to $SiO_2$ ratio of 0.129±10%.

The green nodules are screened to the desired size and prepared for digestion and crystallization. Any oversized materials are granulated and recycled back to the prior steps along with the undersized material. This recycled material is used in subsequent preparation steps.

In the next step of the process, the green nodules are aged for a minimum of 24 hours and placed in a tank containing an NaOH solution containing about 9.3% by weight NaOH (44.4 moles $H_2O$ per mole $Na_2O$). The NaOH solution is circulated through the nodules in the reactor. The concentration of the NaOH in the solution is adjusted to maintain the concentration at about 9.3% by adding an NaOH solution containing 50.5% by weight NaOH as needed. This digestion step is carried out at a temperature of 50 to 70° C., preferably at 60° C. for a period of 12 to 24 hours, preferably 18 hours.

The next step in the process is the crystallization step. After the green nodules have been digested for a proper period of time, the temperatures of the reactor is increased to 210 to 220° F. with maintenance of the concentration of the NaOH solution at 9.3% for a period of 12 to 18 hours. This step crystallizes the components and forms the nodules of the desired zeolite.

In the next step, the nodules are washed to remove any free NaOH by conventional techniques. The washing is preferably carried out at temperatures of about 110° F. until the pH indicates no additional NaOH is being removed. The nodules may be exchanged with calcium chloride or other solutions to convert the nodules from the sodium form to the calcium or other desired form, using standard ion exchange techniques.

In the final step of the preparation, the nodules are dried and calcined at 800 to 950° F. and screened to the proper size.

The essential feature of our invention resides in the maintenance of the proper ratio of water to alkali metal oxide in the reactor. In our novel process, this ratio changes as the alkali metal is adsorbed by the nodules in the reactor and the reaction goes to completion. We achieve this result by maintaining the concentration of the alkali metal in the solution being circulated through the reactor constant as the reaction progresses.

Thus, the $H_2O$ to $Na_2O$ ratio in the reactor might be about 38 at the beginning of the aging step but will decrease to about 23 by the end of the crystallization step since a large quantity of alkali metal will have been adsorbed by nodules at that time.

Our novel process thus has the added feature of providing a convenient method of following the reaction since the rate of addition of alkali necessary to maintain the solution concentration decreases as the reaction progresses and the nodules take up the alkali metal ions at a slower rate. The reaction is essentially complete when the rate of removal of the alkali metal ions from the solution being circulated over the nodules decreases to a very small number.

This process is a plant process for the production of these materials. As pointed out previously, the limitations set out in the steps of this process are necessary if products having the proper characteristics are to be obtained. The process is further characterized by the following specific but nonlimiting examples.

*Example I*

Green nodules were prepared by forming clay and sodium hydroxide solution into large, rough nodules by adding sodium hydroxide solution as a 15% solution to the clay. These large, rough nodules were granulated to form a material having particles in the desired size range. Additional clay and 15% NaOH solution were mixed in proportions such that the mixture contained about 0.081 mole of $Na_2O/SiO_2$. The mixture was a slightly damp powder and was used to control the size of the nodules prepared from the granulation step. Nodule formation was continued until the nodules were of the proper size and form. At this point, a large quantity of clay and $Na_2O$ mixture containing about 0.08 mole of $Na_2O$ per mole of $SiO_2$ were added. The amount of NaOH added to the clay was regulated so that the product contained an $Na_2O/SiO_2$ ratio of 0.129±10%.

The green nodules were screened to a 8 to 12 mesh size range and prepared for digestion. The green nodules were aged for a minimum of 24 hours and 7607 pounds of the nodules were placed in a tank and a total of 1317 gallons of 9.3% by weight of (44.4 moles $H_2O$ per mole of $Na_2O$) NaOH solution was added. The NaOH solution was circulated through the nodules in a reactor. The concentration of the NaOH was adjusted to maintain the concentration at 9.3% by adding 2473.3 pounds of 50.5% sodium hydroxide solution.

The green nodules were digested at a temperature of about 60° C. for a period of about 12 hours and were crystallized by increasing the temperature in the reactor to 210 to 220° F. for a period of 12 hours. This step crystallized the components and formed the nodules into the desired zeolite.

The nodules were washed with water at a temperature of 110° F. until the pH dropped to about 10.5. After the nodules were washed, they were calcium exchanged using a standard ion exchange technique. The exchanged nodules were dried and calcined at a temperature of 800 to 950° F. and again screened to the proper size.

In this operation, the $H_2O/Na_2O$ ratio was 38.22 at the beginning of the run and was 22.95 at the termination of the run.

The product of this run was analyzed for total volatiles by heating the calcined nodules at a temperature of 1750° F. and determining the loss in weight. The water adsorption at 10% relative humidity was determined and the normal butane and isobutane adsorption in grams of butane and isobutane per 100 grams of nodules was determined using conventional techniques. The results of this run is set out in Table I.

TABLE I

| | Product of Example | |
|---|---|---|
| | I | II |
| Total volatiles | 3.12 | 3.71 |
| Water adsorption at 10% relative humidity | 17.69 | 18.27 |
| Normal butane capacity | 10.85 | 11.42 |
| Isobutane capacity | 0.13 | 0.10 |

Total volatiles and water adsorption are reported in percent, butane capacity in grams adsorbed per 100 grams of zeolite.

*Example II*

In this example, the green nodules were prepared and aged using the techniques described in Example I. A total of 4575 pounds of these nodules were transferred to a tank and 1360 gallons of 9.3% sodium hydroxide was added. Sodium hydroxide solution was circulated through the nodules in the reactor.

The concentration of the NaOH solution which adjusted to maintain the concentration at 9.3% by the addition of 1350.5 pounds of 50.5% sodium hydroxide solution over the period of the reaction. The digestion step was carried out at a temperature of about 50° C. for a period of 12 to 18 hours and the green nodules were crystallized by heating the tank to a temperature of 210 to 220° F. for a period of about 12 hours. This step crystallized the nodules and formed the desired zeolite.

The nodules were washed with water at a temperature of 110° F. until the pH of the wash water dropped to pH of 10–11. Subsequently, the nodules were calcium exchanged as outlined in Example I. In the final step, the nodules were dried and calcined at a temperature of 800 to 950° F. and screened to proper size. In this run, the $H_2O/Na_2O$ ratio at the beginning of the run was 39.74 and at the end of the run was 28.11. The calcined nodules were analyzed by determining the total volatiles content. This was done using the techniques described above. As in Example I, the water adsorption at 10% RH and the capacity of the nodules for normal butane and isobutane was also determined. These data are presented in Table I.

The size distribution of the final product is given in Table II. The X-ray diffraction patterns of the products (of Examples I and II) showed that the material was fully crystalline Z-12. This zeolite is the same product as the zeolite designated type A by Linde Division of Union Carbide Corporation and described in U.S. Patent 2,882,243.

TABLE II.—SIZE RANGE OF PRODUCTS OF EXAMPLE

| | I | II |
|---|---|---|
| Percent of Nodules Retained on U.S. Sieves: | | |
| No. 8 | 8.7 | 9.9 |
| No. 12 | 88.0 | 76.4 |
| No. 14 | 98.8 | 97.1 |
| No. 20 | 100 | 100 |
| No. 100 | 100 | 100 |

Obviously, many modifications and variations of the invention may be made without departing from the essence of the scope thereof and only such limitations should be included as are indicated in the appended claims.

What is claimed is:

1. A process for preparing Z-12 zeolitic adsorbents in nodular form which comprises the steps of:
    (a) preparing green nodules by mixing a kaolin-type clay calcined at a temperature within the range of 550° C. to 850° C. to an alkaline hydroxide reactive form and sodium hydroxide solution to prepare a product with $Na_2O$ to $SiO_2$ ratio of about 0.13,
    (b) aging the green nodules at ambient temperature for a minimum of 24 hours,
    (c) digesting the nodules with a circulating sodium hydroxide solution maintained at a substantially constant concentration of about 9.3 weight percent at a temperature of about 50–60° C. for a period of 12 to 24 hours,
    (d) crystallizing the nodules to the Z-12 zeolite by heating at a temperature of 210° F. to 220° F. for 12 to 18 hours,
    (e) washing the product to remove excess alkali,
    (f) drying, calcining at about 800 to 950° F. and recovering the nodular product.

2. The process according to claim 1 wherein the green nodules are prepared by mixing about a 15 weight percent NaOH solution with the clay and forming the nodules.

3. The process according to claim 1 wherein the NaOH solution is maintained at about 9.3 weight percent concentration by adding a concentrated sodium hydroxide solution as the sodium hydroxide solution is adsorbed by the green nodules.

4. The process according to claim 3 wherein the added sodium hydroxide concentration is about 50%.

5. The process according to claim 1 wherein the crystallized nodules are washed with water at a temperature of about 110° F. until the pH of the wash water is about 10 to 11.

6. A process for preparing Z-12 zeolitic adsorbents in nodular form which comprises the steps of:
    (a) preparing green nodules by mixing a kaolin-type clay calcined at a temperature within the range of 550° C. to 850° C. to an alkaline hydroxide reactive form and 15% sodium hydroxide solution to prepare a product having a $Na_2O$ to $SiO_2$ ratio of about 0.13 and forming the mixture into nodules,
    (b) aging the green nodules at ambient temperature for a minimum of 24 hours,
    (c) digesting the nodules with a circulating sodium hydroxide solution maintained at a substantially constant concentration of about 9.3 weight percent at a temperature of about 50–60° C. for a period of 12 to 24 hours,
    (d) crystallizing the nodules to Z-12 zeolite by heating to a temperature of 210 to 220° C. for a period of 12 to 18 hours,
    (e) washing the product with water heated to about 110° F. until the pH of the effluent is about 10–11,
    (f) drying the washed nodules and calcining at 850° F. to 950° F. and recovering the nodular product.

7. The process according to claim 6 wherein the clay is selected from the group consisting of kaolinite, levisite, nacrite, dickite, endellite, halloysite and the like.

8. The process according to claim 6 wherein the nodules recovered in step (f) are converted to the calcium form by ion exchange with a soluble calcium salt solution after the washing step.

References Cited
UNITED STATES PATENTS

| | | | |
|---|---|---|---|
| 2,992,068 | 7/1961 | Haden et al. | 23—112 |
| 3,119,659 | 1/1964 | Taggart et al. | 23—112 |
| 3,205,037 | 9/1965 | Maher et al. | 23—112 |

EDWARD J. MEROS, *Primary Examiner.*